US008391857B2

(12) United States Patent
Catalano et al.

(10) Patent No.: US 8,391,857 B2
(45) Date of Patent: Mar. 5, 2013

(54) METHOD FOR INTERACTIVE MOBILE NETWORK SELECTION

(75) Inventors: Giuseppe Catalano, Turin (IT); Davide Mamino, Turin (IT); Marco Marchisio, Turin (IT)

(73) Assignee: Telecom Italia S.p.A., Milan (IT)

( * ) Notice: Subject to any disclaimer, the term of this patent is extended or adjusted under 35 U.S.C. 154(b) by 977 days.

(21) Appl. No.: 11/918,748

(22) PCT Filed: Apr. 18, 2005

(86) PCT No.: PCT/EP2005/004100
§ 371 (c)(1),
(2), (4) Date: Feb. 10, 2009

(87) PCT Pub. No.: WO2006/011176
PCT Pub. Date: Oct. 26, 2006

(65) Prior Publication Data
US 2009/0215447 A1    Aug. 27, 2009

(51) Int. Cl.
H04W 4/00    (2009.01)
(52) U.S. Cl. .................. 455/432.1; 455/422.1; 455/433; 455/552.1; 455/437; 455/436
(58) Field of Classification Search ............... 455/432.1, 455/422.1, 433, 437, 552.1, 436
See application file for complete search history.

(56) References Cited

U.S. PATENT DOCUMENTS

| | | | |
|---|---|---|---|
| 2002/0082051 A1* | 6/2002 | Tangorra et al. | 455/561 |
| 2002/0087674 A1* | 7/2002 | Guilford et al. | 709/223 |
| 2004/0132449 A1* | 7/2004 | Kowarsch | 455/432.1 |
| 2004/0192306 A1 | 9/2004 | Elkarat et al. | |
| 2004/0235476 A1 | 11/2004 | Martlew | |
| 2005/0037755 A1 | 2/2005 | Hind et al. | |
| 2005/0130661 A1* | 6/2005 | Aerrabotu et al. | 455/437 |
| 2005/0276229 A1* | 12/2005 | Torabi | 370/252 |

FOREIGN PATENT DOCUMENTS

| | | |
|---|---|---|
| WO | WO 95/07010 | 3/1995 |
| WO | WO 02/32181 A1 | 4/2002 |
| WO | WO 2004/014101 A2 | 2/2004 |
| WO | WO 2004/066663 A1 | 8/2004 |

OTHER PUBLICATIONS $3^{RD}$ Generation Partnership Project; Technical Specification Group Core Network; Non-Access-Stratum (NAS) Functions Related to Mobile Station (MS) in Idle Mode (Release 6), 3GPP TS 23.122 V6.4.0 (Mar. 2005).

* cited by examiner

Primary Examiner — Kwasi Karikari
(74) Attorney, Agent, or Firm — Finnegan, Henderson, Farabow, Garrett & Dunner, L.L.P.

(57) ABSTRACT

A method allows the selection of a user-preferred visited mobile network for a roaming mobile terminal of a subscriber of a home network. The method includes, at the home network, the steps of receiving information on the location of the roaming mobile terminal, and receiving from the roaming mobile terminal service information including at least a choice of a service and controlling the selection of the visited mobile network for the roaming mobile terminal on the basis of the received service information and location information.

20 Claims, 4 Drawing Sheets

METHOD FOR INTERACTIVE MOBILE NETWORK SELECTION

CROSS REFERENCE TO RELATED APPLICATION

This application is a national phase application based on PCT/EP2005/004100, filed Apr. 18, 2005, the content of which is incorporated herein by reference.

FIELD OF THE INVENTION

The present invention generally relates to the field of mobile telecommunications, in particular to the field of roaming in mobile (or cellular) networks. More in particular, the invention concerns a telecommunication service, a method and a system for enabling the user of a mobile communication terminal (e.g., a mobile phone) to select a user-preferred network via interaction with the Home Operator when roaming.

BACKGROUND OF THE INVENTION

A mobile communication device may be capable of making and receiving voice and/or video calls and/or sending and receiving data over a wireless communication network. Before it is able to do this, the mobile station has to select a communication network and register on it. The procedures of Network Selection and Location Registration are included among the Idle Mode procedures and are performed on signaling channels.

In a given geographical location (such as a country or a town), typically there are simultaneously many mobile network operators. These network operators include, but are not limited to, operators who provide mobile services using GSM, GPRS, EDGE, CDMA and UMTS technologies or their variants. These network operators provide services, such as voice and data services, to their own subscribers and to subscribers from other networks, said latter subscribers being referred to as "roamers". When the network operator provides services to a roamer from a foreign country, it is referred to as "international roaming". When the network operator provides services to a subscriber from another network in the same country, it is referred to as "national roaming".

The network with which a subscriber has a subscription and, as a consequence, a direct billing relationship is referred to as the Home Public Land Mobile Network (HPLMN or Home Network) and it is operated by the Home Operator. To the purpose of the present description, the terms Operator and Network are in general interchangeable. If the subscriber is in a network with which it does not have a subscription and a direct billing relationship, the serving network is referred to as the Visited Public Land Mobile Network (VPLMN), and the subscriber is referred to as an in-roamer by the VPLMN. The same subscriber is referred to as an out-roamer by the HPLMN. A roaming agreement is required between the two PLMNs, including both technical topics (signaling and traffic connections establishment, etc.) and commercial topics (Inter Operator Tariffs, billing arrangements, SLAs and so on). The in-roamers are treated as temporary subscribers from a service availability perspective, while the billing for usage incurred by them is through inter-carrier settlements via the home network of the subscriber. In the following, the term "roam" will be used also for mobile terminals or users, that are attempting to register on a network other than the Home Network.

When "home" subscribers roam into visited networks, they may roam onto one of the plurality of communication networks which are available within the relevant geographic coverage area and have a roaming agreement with the home network. "Network Selection" or "PLMN Selection" is the particular process performed by the mobile station for selecting the one communication network over which to register and operate.

The standard specification TS 23.122 V6.4.0 (2005-03) "Technical Specification Group Core Network; NAS Functions related to Mobile Station in idle mode" from the 3GPP describes the PLMN Selection procedure for the mobile standard Global System for Mobile Communication (GSM).

In automatic network selection mode the mobile terminal automatically uses a set of rules to find the network to register with. Industry specifications state a possible order of these rules as:

1. The last selected network (from Elementary File "EF-LOCI" on the SIM card);
2. The Home Network if it's available (based on MCC and MNC from IMSI);
3. If the last registered network is not found, the mobile terminal tries to register on the list of networks from the Preferred PLMN Lists that is stored in memory (e.g. "EF-PLMNSEL" on SIM card) in priority order excluding the previously selected PLMN;
4. Other PLMN with a received signal level above a given threshold in random order excluding the previously selected PLMN; and
5. Any other PLMN excluding the previously selected PLMN in order of decreasing signal strength.

In manual network selection mode, the mobile terminal displays a list of available networks to the user. The user selects one of them and the mobile terminal attempts registration onto that network. If the registration is not successful, the mobile terminal shows the list of networks to the user once again. In manual mode, the user performs the selection of a particular network with no or few information about the available networks.

Over the last few years, traffic (and high-margin revenues from roamers) related to wireless services in roaming scenarios is matching a continuous growth as mobile penetration in local markets increases and people more often travel for business and vacation. Various network operators have partnership agreements with each other (alliances) that include more favorable roaming charges than non-partners receive. As a consequence, there is a tendency for network operators being interested in controlling the process of PLMN selection to protect the existing roaming revenues and grow them further and to give the best service experience to the subscribers even when roaming.

A commonly-used method of attempting to prevent roaming subscribers from registering with non-preferred networks includes storing lists of preferred networks on a SIM in the subscriber's mobile terminal (such as the Preferred PLMN lists). The list can be burned on the SIM or updated using Over-The-Air (OTA) messages. This list influences the initial selection of the preferred network. Disadvantages coming from the above Preferred PLMN lists are the consumption of memory SIM resources (which may in turn prohibit the storing of the list in legacy SIM having low memory), the consume of network resources for their upgrading, the fact of being equal for all the users.

To counteract the fact that, due to various reasons (for example, the preferred network is not currently available or loses coverage), the mobile terminal may also select a non-preferred network (e.g. steps 4 or 5 above) and remain there unless the non-preferred network loses the radio coverage (even when the handset is powered off, the non-preferred network stays on the SIM card and oh next power on it will be selected according to step 1 above), PLMN selection techniques are known which allow the Home Operator to control the Visited PLMN choice on which the roaming user registers, by way of prohibiting the registration to the attempted network in case the request originates from a network not preferred by the Home Operator or forcing a new registration if the mobile terminal is already registered on a network not preferred by the Home Operator. Using an apparatus in the Home network, the signaling originating from an out-roamer is intercepted and a Home-preferred Operator selection is forced. It is also contemplated the possibility to update suitable files present on the SIM (e.g. PLMNSEL, LOCI e FPLMN), via OTA, typically using a SIM Application Toolkit. See for example WO2004/014101 "Method and System for Cellular Network Traffic Redirection", WO2004/066663 "Roaming Method" and U.S. 2004/0192306 "Preferred Network Selection".

In WO 02/32181 "Method and system for selecting service provider based on roaming charges", a user, through using a program application for roaming existing in a mobile telephone, specifies which operator is most cost-effective for voice call at a given point in time.

U.S. 2005/0037755 describes a network selection technique for a mobile communication device which provides several different features and functions which require associated network services, such technique taking into account the availability of all of these services. The mobile device identifies one or more communication networks available for communication within a geographic coverage area, using a conventional scanning operation. Next, the mobile device identifies one or more communication services made available by each one of these communication networks, for example at least in part by actually attempting to access the service in the network. Next, the mobile device selects communication networks in a prioritized fashion based on the communication services that are made available by it. If assigning priorities, the mobile device preferably keeps a prioritized network list of networks from the "best" to "worst". The "best" network may be the one that provides the greatest number of communication services for the mobile device or the one that provides the greatest number of preferred communication services for the mobile device. Here, the one or more preferred communication services may be predefined by the network, predefined by the mobile device manufacture (stored in the device's memory), or predefined by the end-user who programs such service priorities via the user interface. In another variation, each communication service is preassigned a relative weight value and a sum of relative weight values for available communication services in each network is calculated. Here, the "best" network having the largest sum of weight values is kept at the top of a prioritized network list. Additional weightings may be used as well for these decision-making process, including success rate, data throughput rate (specified or actual), and cost.

SUMMARY OF THE INVENTION

Nowadays, the offer of services by mobile operators is becoming more and more articulate, since it may include voice and basic data service (SMS), rich wireless data services (WAP, MMS, wireless e-mail, Internet access) with narrow or broadband access, multimedia services (videocall, combinational services, etc) and so on. The Applicant has noted that in this context mobile users are interested in selecting a mobile operator when roaming on the basis of many factors, that may exemplarily be the lowest tariff, the lowest tariff for a certain set of services only, the availability of a specific service whatever the fare, the best available Quality of Service (QoS), the best available QoS for a certain set of services only and so on. Moreover the needs of mobile users may dynamically vary depending on the scenario. The Applicant thus observes that the process of PLMN Selection in roaming scenarios needs to be articulated and tuned on the specific and present requirements of any single mobile user. The Applicant envisages that alliances between Operators may develop so as to allow them defining much more articulate roaming agreements. These may provide that each Operator possesses a complete bulk of information relating to the other Operators, such as information relating to provided services, including availability, costs, QoS, coverage, etc.

The Applicant has thus faced the problem of allowing an out-roamer to choose the best operator on the basis of specific needs: for example a user interested to basic services (such as voice and SMS) could prefer the most economical operator for these services only, while a Business user may consider more important other parameters such as for example the available bandwidth for data traffic.

In particular, the Applicant has faced the problem of how to allow mobile users and their Home Networks to select a Visited PLMN in a roaming scenario, on the basis of user's needs, even dynamically, suiting both mobile users and their Home Networks needs. The selected VPLMN is the network most suitable to the set of services which the user means to use, according to certain criteria defined by the user. The choice is negotiated with the Home Operator on the basis of its roaming agreement.

To this purpose, the Applicant has observed that it would be useful if an out-roamer could interact with the Home Operator. The VPLMN selection is thus based on the services requested by the out-roamer and on the associated parameters (such as availability, cost, QoS), as well as on the basis of information possessed by the Home Operator relating to, for example, VPLMN service offering and network status.

Accordingly, the scenario wherein the present invention finds application envisages that in the geographical area where a user is roaming a plurality of Operators exists having a roaming agreement with the Home Operator. The roamer, preferably having explicitly subscribed the service of interactive roaming PLMN Selection, informs the Home Network about the set of services which he/she means to use during his/her roaming status and, advantageously, the Home Network creates a list of Operators which the mobile terminal may register with, sorted by, for example, priority criteria also communicated by the roamer. The service information communicated by the out-roamer comprising at least a choice of a service and at least a choice of a priority criterion is referred to as "service profile". The communication between the roamer and the Home Network typically uses the bearers available from the Visited Operator which the roaming mobile terminal has initially registered onto. This initial Visited Operator may be selected by the Home Operator, which may select a network with data transmission capabilities (e.g. GPRS) and advantageous billing conditions related to data services, in order, optionally, not to make the user pay for the negotiation traffic relevant to the interactive PLMN selection.

The following options for the choice of the service profile are preferably contemplated by the present invention:
  the roaming user selects an associated default service profile;

the roaming user selects a service profile among a list of predefined service profiles (services plus criteria) presented by the Home Operator;

the roaming user creates a customer set of services and then selects the preferred criteria using templates furnished by the Operator.

In one embodiment, the Home Operator, in reply to the service profile chosen by the mobile user, sends to the roamer's mobile terminal a list of possible Visited Operators, sorted by the priority criteria indicated by the user (e.g. availability of service, cost, QoS). After this interaction the mobile terminal selects a Visited Network and camps on it. The Home Network may use solutions known in the prior art and based on network equipment and OTA and SAT, to control the camping of the roamer on the selected PLMN.

According to an aspect of the present invention, a method is provided, for enabling the selection of a visited mobile network for a roaming mobile terminal of a subscriber of a home network, the method comprising, at the home network:

a. receiving information on the location of the roaming mobile terminal;

b. sending to the roaming mobile terminal a request for service information, and requesting from the user of the roaming mobile terminal a choice of a service profile;

c. receiving from the roaming mobile terminal service information comprising a user-preferred service profile chosen by said user; and d. controlling the selection of the visited mobile network for the roaming mobile terminal on the basis of the received service information and location information.

One advantage of the present invention is that the amount of information that the roaming mobile terminal needs to download is limited, being the selection of the visited mobile network controlled by the home network Another advantage is that the computational resource employed for processing the data required for the selection of the best VPLMN finds itself in the Home Network, thus freeing resources on the mobile terminal.

Preferably, in the step of controlling the selection of the visited mobile network (step c), the home network creates a prioritized list of visited mobile networks on the basis of the received service information, location information and information on said visited mobile networks possessed by the home network. This solution allows the processing of a great amount of data relating to the visited networks, far greater than those data which the roaming mobile terminal may detect by itself from the roaming environment, thus allowing a precise selection of the visited PLMN which best fit the roamer preferences.

Advantageously, the home network sends at least a portion of said prioritized list to the roaming mobile terminal.

Preferably, said portion of the prioritized list is suitable for use by the roaming mobile terminal for selecting said visited mobile network.

Optionally, said portion of the prioritized list is made available to a user of the roaming mobile terminal for selecting said visited mobile network.

In a preferred configuration, in the step of controlling the selection of the visited mobile network (step c), the home network sends to the roaming mobile terminal command information suitable for the registration of the roaming mobile terminal to the visited mobile network. Preferably, the command information comprises a refresh command for the mobile terminal.

Advantageously, said service information further comprises at least a choice of a criterion for preference of the visited mobile network.

Typically, the home network sends to the roaming mobile terminal a request for service information.

In one embodiment, the received service information is a confirmation of a default service information.

In another embodiment, the received service information comprises a service profile chosen by a user of the roaming mobile terminal from a list of predefined service profiles, said list being previously sent by the home network to the roaming mobile terminal.

In a further embodiment the received service information comprises a service profile created by a user of said roaming mobile terminal in interaction with the home network.

These two preceding solutions, wherein an articulate interaction between the out-roamer and the home network takes place by way of guided menu, allow the home network to display to the out-roamer up-to-date information (taking into account current availability, congestion, etc.) and, moreover, to display only those pieces of information which are useful for selecting the preferred network, taking into account the current location of the out-roamer and the choices which the out-roamer takes step by step.

Preferably, the visited network and the home network comprise GSM or GPRS or UMTS networks.

According to another aspect of the present invention, a method is provided for selecting a visited mobile network for a roaming mobile terminal of a subscriber of a home network, the method comprising:

a. receiving at the roaming mobile terminal a request for service information requesting from the user of the roaming mobile terminal a choice of a service profile;

b. sending from the roaming mobile terminal to the home network service information comprising a user-preferred service profile chosen by said user;

c. receiving at the roaming mobile terminal from the home network command information depending on the service information and on information on the location of the roaming mobile terminal; and d. using said command information at the roaming mobile terminal for selecting the visited mobile network.

Preferably, said command information comprises a prioritized list of visited mobile networks created by the home network on the basis of the service information, the location information and information on said visited mobile networks possessed by the home network.

Advantageously, said service information further comprises at least a choice of a criterion for preference of the visited mobile network.

In one embodiment, said service information may be a confirmation of a default service information.

In another embodiment, said service information comprises a service profile chosen by a user of the roaming mobile terminal from a list of predefined service profiles, said list being previously received at the roaming mobile terminal from the home network.

In a further embodiment, said service information comprises a service profile created by a user of said roaming mobile terminal on the basis of templates received at the roaming mobile terminal from the home network.

In a further aspect of the present invention, a mobile telecommunication service is provided for selecting a user-preferred visited mobile network for a roaming mobile terminal based on any of the methods above.

In a still further aspect of the present invention, a mobile network is provided, which comprises a unit adapted to monitor a signaling network connecting the mobile network to a roaming environment and to control the selection of a visited mobile network for a mobile terminal in said roaming environment, a database comprising data on mobile networks within said roaming environment and an application server, operatively connected to the database and to the unit, adapted to receive information on the location of the mobile terminal in the roaming environment, to send to the mobile terminal a request for service information, and requesting from the user of the mobile terminal a choice of a service profile, to receive from the mobile terminal in said roaming environment service information comprising a user-preferred service profile chosen by said user, and to instruct the unit to control the selection of the visited mobile network on the basis of the received location information and service information and of the data comprised in the database.

Said application server is preferably further adapted to create a prioritized list of the mobile networks within said roaming environment on the basis of the received location information and service information and of the data comprised in the database and, more preferably, the unit is further adapted to send at least a portion of said prioritized list to the mobile terminal.

Advantageously, said portion of the prioritized list is suitable for use by the mobile terminal for selecting said visited mobile network.

The unit is preferably further adapted to send to the mobile terminal command information suitable for the registration of the mobile terminal to the visited mobile network. More preferably, the command information comprises a refresh command for the mobile terminal.

Advantageously, said service information further comprises at least a choice of a criterion for preference of the visited mobile network.

The application server is preferably further adapted to send to the mobile terminal a request for service information.

In one embodiment, the service information is a confirmation of a default service information.

The application server is further preferably adapted to send to the mobile terminal a list of predefined service profiles suitable for a choice by a user of the mobile terminal.

The application server in one configuration is further adapted to send to the mobile terminal one or more templates suitable for the creation by a user of the mobile terminal of a service profile.

The mobile network typically comprises GSM or GPRS or UMTS networks.

BRIEF DESCRIPTION OF THE DRAWINGS

The features and advantages of the present invention will be made clear by the following detailed description of an embodiment thereof, provided merely by way of non-limitative example, description that will be conducted making reference to the annexed drawings, wherein.

DETAILED DESCRIPTION OF THE PREFERRED EMBODIMENT(S) OF THE INVENTION

Figure 1:
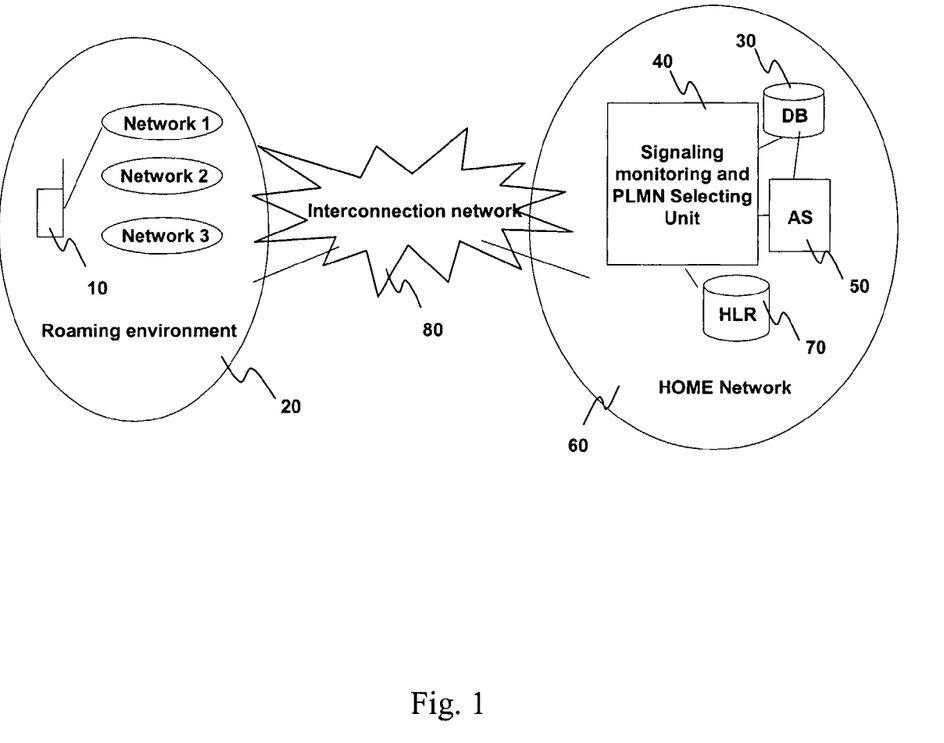
FIG. 1 schematically shows in terms of functional blocks an exemplary system architecture according to an embodiment of the present invention.

FIG. 1 shows a system architecture according to an embodiment of the present invention. A mobile terminal 10 is a mobile device having wireless connectivity functionality, typically with an associated SIM/USIM, such as for example a mobile phone, a laptop computer, a personal digital assistant (PDA). As will become clear from what follows below, to the purpose of the present invention it is sufficient that the mobile terminal 10 is furnished with standard transmission functionality (such as, e.g., GPRS, Circuit Switched Data-CSD, SMS, Unstructured Supplementary Services Data-USSD, UMTS). This is advantageous in that the present invention does not require the presence of a specific client resident onto the mobile terminal 10, thus freeing mobile terminal resources. Preferably, the mobile terminal 10 is furnished with SIM Toolkit application (STK) functionality in order to facilitate the interactive PLMN selection of the present invention.

A user (not shown) of the mobile terminal 10 is a subscriber of the Home Network 60, also referred to as the Home Public Land Mobile Network (HPLMN). Information about the mobile users having billing relationship with the HPLMN is typically maintained in a Home Location Register (HLR) 70. Mobile terminal 10 roams in a roaming environment 20, wherein a plurality of networks is present (e.g. Network1, Network2, Network3 in FIG. 1). The roaming environment 20 may be, for example, a foreign country or town, or, more in general, a geographical area where the Home Network 60 has not coverage or is not available or, more generally, there is a need to select a mobile network (VPLMN) other than the Home Network 60. An interconnection network 80, such as for example an SS7/MAP signaling network, establishes a link between the HPLMN 60 and the roaming environment 20. The interconnection network 80 gives the functionality suitable to support roaming and relevant notifications (such as billing, etc) between the HPLMN 60 and the roaming environment 20.

Home Network 60 preferably comprises a unit 40 (signaling monitoring and PLMN selecting unit 40) configured to monitor the signaling of the interconnection network 80 and to control or force the selection of the one network (VPLMN, e.g. Network1 in FIG. 1) in the roaming environment 20 which the mobile terminal 10 will register onto. Various embodiment and various modes of operation of unit 40 are known in the art, some of which are also available on the market. For further details, reference is made to WO2004/014101 "Method and System for Cellular Network Traffic Redirection", WO2004/066663 "Roaming Method" and U.S. 2004/0192306 "Preferred Network Selection".

A database 30 stores the data which are needed to assist the interactive selection of a user-preferred Visited Network according to the present invention. The database 30 may be located in a single location or distributed in a plurality of (physical and/or logical) locations. Information contained within the Database 30 includes information relating to the home users and information relating to the Networks which the Home Operator has roaming agreements with. Preferably, a specific roaming alliance is signed between the Home Network and the other Networks for implementing the service of the present invention (e.g. exchanging the data needed to furnish the service).

Possible data in database 30 are:
  home user information database: various characteristics associated to each user: for example, contract type (pre-paid or post-paid), default or last used service profiles (as explained further below), etc.;
  network information database: updated list of the Networks present in any geographical area (e.g. in any nation or town) with related information, such as existence, terms and conditions of the roaming agreement, the services offered and the relevant parameters, such as for example the available QoS, the costs and tariffs, the territory coverage, the current status of the Network (e.g. traffic congestion, failure, etc), etc. . . .

In a configuration, the database 30 stores the data relating to the service profiles of only the users of the HPLMN which have explicitly subscribed the interactive selection service in accordance with the present invention, with or without a payment by such subscribers to the HPLMN of a subscription fee. In another configuration, the service in accordance with the present invention is automatically provided by the HPLMN to all its home users and consequently the database 30 stores the service profiles associated to all the users of the HPLMN.

An Application Server 50 in the HPLMN 60 is configured to interact with the mobile terminal 10 and the database 30. Optionally, it may also interact with the unit 40 in order to give instruction on network redirection. The Application Server 50 may include a Web Server adapt to be browsed by a standard browser, so that it is not required the presence of a specific client resident onto the mobile terminal 10. In a configuration, the Application Server may interact with the out-roamer using basic standard transmission functionality (such as, e.g., Circuit Switched Data-CSD, SMS, Unstructured Supplementary Services Data-USSD).

More in general, it is contemplated also the embodiment (not shown) wherein the AS 50 and/or the DB 30 and/or the unit 40 are owned by a third party which furnishes the interactive network selection service to the subscriber home network 60.

Figure 2:
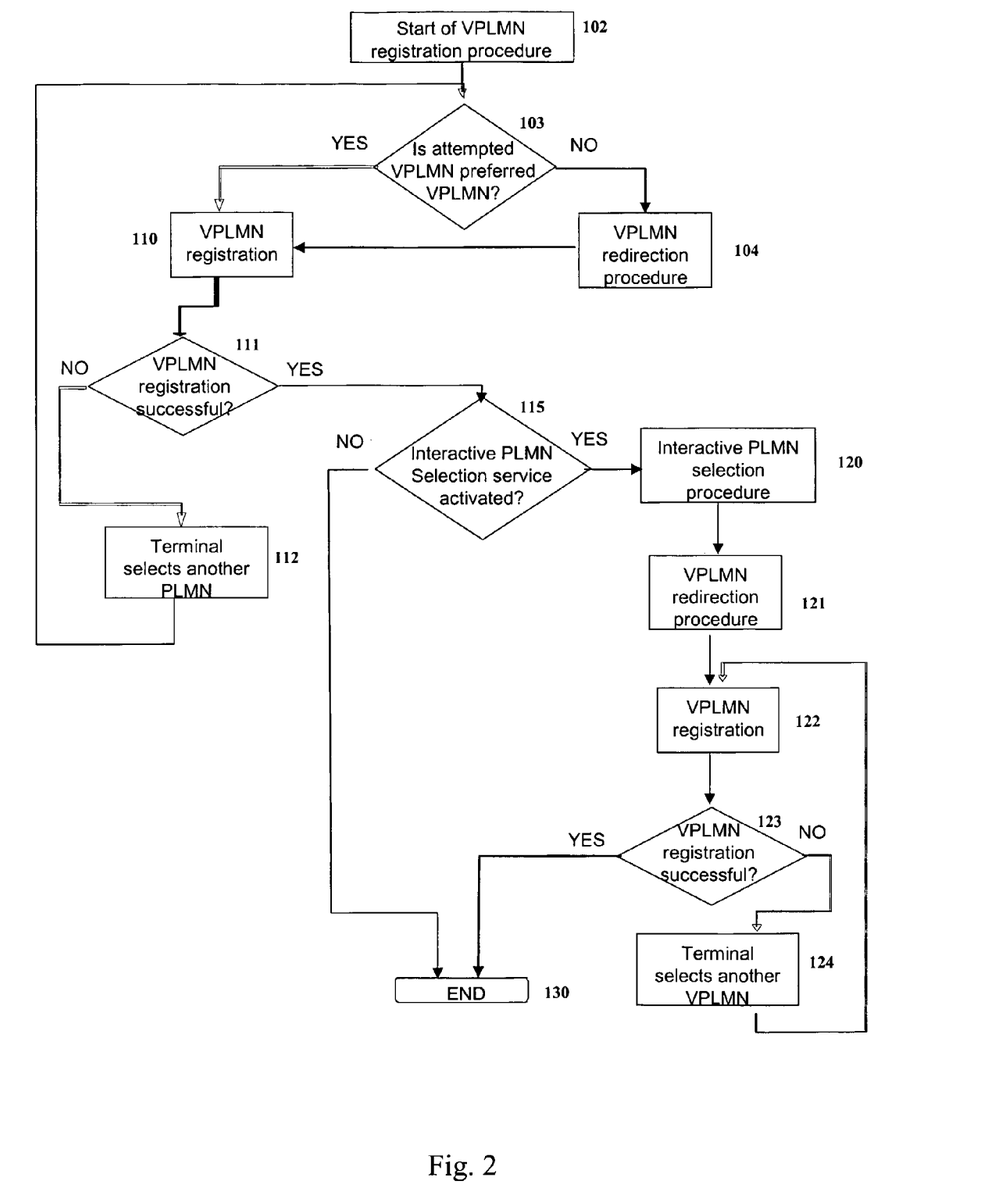
FIG. 2 is a schematic flowchart showing the main steps of a PLMN Selection procedure, in an embodiment of the present invention.

FIG. 2 shows a procedure of PLMN selection in accordance with an embodiment of the present invention. When applicable, reference to elements shown in FIG. 1 is made using the same reference numerals of FIG. 1.

According to FIG. 2 the procedure of PLMN selection includes the following steps:

[Step 102] A mobile terminal 10 in a roaming environment 20 starts a registration procedure with a currently selected VPLMN, for example according to standard PLMN Selection procedure. The Home Network 60, for example by way of the signaling network 80, is informed that a home subscriber has an out-roamer status and is attempting to register onto the VPLMN. In this step, the Home Operator becomes also aware of the roaming location of the terminal. To the purpose of the present invention, the location may be the roaming environment 20 (e.g. a country or a town) or, in a preferred configuration, the geographic position (e.g. a cell) within the roaming environment 20;

[Steps 103-104] Optionally, a procedure is performed in order to allow the Home Operator to force the selection of a VPLMN according to the Home Operator preference criteria. Such VPLMN may exemplarily be the one which has data transmission capabilities (e.g. GPRS) and the most profitable roaming agreement with Home Operator (e.g. advantageous IOT, especially related to data traffic). This is advantageous in that the Home Operator may provide the Interactive PLMN Selection Service (Step 120 below) without making the user pay for the relevant negotiation traffic. Other criteria may be followed in these steps, for example in order to select the VPLMN which provides the best service experience by the out-roamer (e.g. best coverage in the territory).

[Step 103] Home Network checks the currently attempted VPLMN;

[Step 104] If the current PLMN which the out-roamer is attempting to register onto is not the Home-preferred network, a VPLMN redirection procedure is activated by the Home Operator through the unit 40. In the art, various techniques are known which allow redirection towards a selected network. Such techniques may be based on rejecting the attempted registration by the Home Network until a preferred VPLMN is selected or on modifying suitable files existing on the SIM or a combination thereof These files relate to, for example, the network identity and the location area in the network which the mobile terminal was last registered onto (LOCI), the list of preferred PLMN (PPLMN), either by the home operator (O-PPLMN) or by the user (U-PPLMN), the list of forbidden PLMN (FPLMN), etc. The updating of these files may be done by the Home Operator by way of Over-The-Air (OTA) techniques, optionally using SIM Application Toolkit on the roaming SIM. In some cases such VPLMN redirection techniques also envisage sending a refresh command to the mobile terminal. The refresh command may have different levels ranging from information to the terminal that a specific file on the SIM has been updated to a more or less hard reset of the SIM. The purpose of issuing the refresh command may be to make the terminal search for a preferred network as defined in the roaming control lists.

[Step 110] In case optional Steps 103 and 104 are not performed or if the attempted PLMN is the Home-preferred Network, the Home Operator gives authorization for the registration and the mobile terminal 10 is registered onto the VPLMN.

[Step 111] The outcome of the attempted registration is checked. Typically, both the terminal 10 and the Home Operator are informed about the outcome of the attempted registration;

[Step 112] If the registration was not successful, the mobile terminal 10 selects another PLMN on the list on which try registration and the procedure continues from optional Step 103 or Step 110. This cycle (Steps 103 to 112) is iterated until the registration is successful;

[Step 115] If the registration is successful, optionally the Home Network verifies whether the out-roamer has subscribed the interactive PLMN selection service. This is done in case the service of the present invention needs an explicit subscription by the user;

[Step 130] If the out-roamer has not subscribed such service, the current status is maintained and the roamer remains camped on the current VPLMN;

[Step 120] If the out-roamer has subscribed such service or if optional Step 115 is not performed (e.g. because no subscription is needed to activate such service) the Home Network starts the interactive PLMN selection procedure. As will be described in greater details with reference to FIGS. 3 and 4 below, the Application Server 50 receives information about the roaming location of the user (for example through the signaling monitoring unit 40). The AS 50 preferably triggers the interactive PLMN procedure by sending a request of service information to the mobile terminal 10. The Application Server 50 receives at least a choice of a service and preferably a further choice of a preference criterion from the mobile terminal 10 and, by interacting with the Database 30, determines the best PLMN according to the received service profile and roaming location. Preferably the Application Server 50 creates a list of user-preferred PLMN sorted by the received priority criteria. The list is typically ordered from best to worst.

[Step 121] The Home Operator controls the selection of the user-preferred VPLMN, e.g. it activates a VPLMN redirection procedure if needed. Among the techniques useful for redirection towards a selected network there are those described above with reference to Step 104. However, now the list of PLMNs for PLMN selection is the prioritized list in output from Step 120 above. It is a task of unit 40, instructed by AS 50, to guarantee that the mobile terminal 10 registers onto the best available user-preferred VPLMN. In a preferred configuration, the PLMN redirection is transparent to the out-roamer. Alternatively, or in addition to the transparent redirection procedure above, the prioritized list of user-preferred PLMN is sent by the Home Operator to the mobile terminal for visualization and use by the out-roamer. He may, for example, choose a VPLMN in the list independently by its rank in the list. In one embodiment, the out-roamer may activate a manual VPLMN selection procedure based on the prioritized list received by the Home Network and visualized on the terminal, without the need of assistance in doing so by the Home Operator. By this solution the unit 40 of FIG. 1 may be not activated for redirection.

[Step 122] The mobile terminal 10 attempts to register onto the selected VPLMN;

[Step 123] The outcome of the attempted registration is checked;

[Step 124] If the registration was not successful, the mobile terminal selects the next PLMN on the prioritized list created in Step 120 and the procedure continues from Step 122. This cycle (Steps 122 to 124) is iterated until the registration is successful.

[Step 130] If the registration is successful the roaming mobile terminal may use the services furnished by the VPLMN selected according to the Steps above.

In Step 120 the Home Network triggers the procedure of interactive Visited PLMN selection, which may or may not use a dedicated application resident on the mobile terminal 10 (or on its SIM). Preferably, a possible way to execute the above procedure without the need of a dedicated resident application may be based on the WAP Push technique, wherein the HPLMN sends an SMS to the mobile terminal to force a data connection opening. Then the exchange of information between the out-roamer and the Home Network may rely upon a standard WAP or WEB browser, typically resident on the terminal.

The Home Network may trigger the procedure of interactive Visited PLMN selection at any time there is an advantage to do so. Typically, it may activate the interactive network selection when the terminal registers or attempts to register for the first time in a roaming environment (20), as exemplarily shown in FIG. 2. As another example, the interactive network selection may be activated whenever the roaming terminal is switched on, also depending on the current setting of the interactive PLMN service.

In addition, the Home Operator may trigger, or suggest the out-roamer to do that, the interactive selection procedure any time the roaming conditions change. For example, the Home Operator may receive information about a change of the roamer location within the roaming environment (20) (for example a different location within the same country) and in the new location the roaming conditions are different from the previous ones. As another example the Home Operator may know that a change in the current roaming conditions occurred, such as for example a temporal network failure or congestion. The relevant information needs to be exchanged between Home and Visited Operator.

Moreover, the Home Operator may be aware that its out-roamer is using a service not previously selected by the roamer. For example, it may notice that the out-roamer is generating data traffic, without previously having chosen such service. In this case, the HPLM may activate, for example by way of the WAP Push technique described above, the interactive selection procedure, or it may send a message to its out-roamer informing him/her that a better VPLMN may be present in the location and asking the consent/suggesting to trigger the interactive selection.

The interactive PLMN selection procedure according to the present invention may be triggered, besides by the Home operator as described above, by the out-roamer at any time, for example because of a change of mind or a change in his/her service needs. Accordingly, the out-roamer may change at any time the previously chosen set of services or the network preference criteria. A possible way to activate the interactive selection procedure is directly connecting the terminal web browser to a suitable WEB or WAP page via a data connection such as UMTS, GPRS, EDGE or the like. A further possible way is that the roamer sends to the HPLMN an SMS which triggers the sending of a reply SMS to the terminal which in turn starts the WEB or WAP browser application with the suitable web page.

Figure 3:
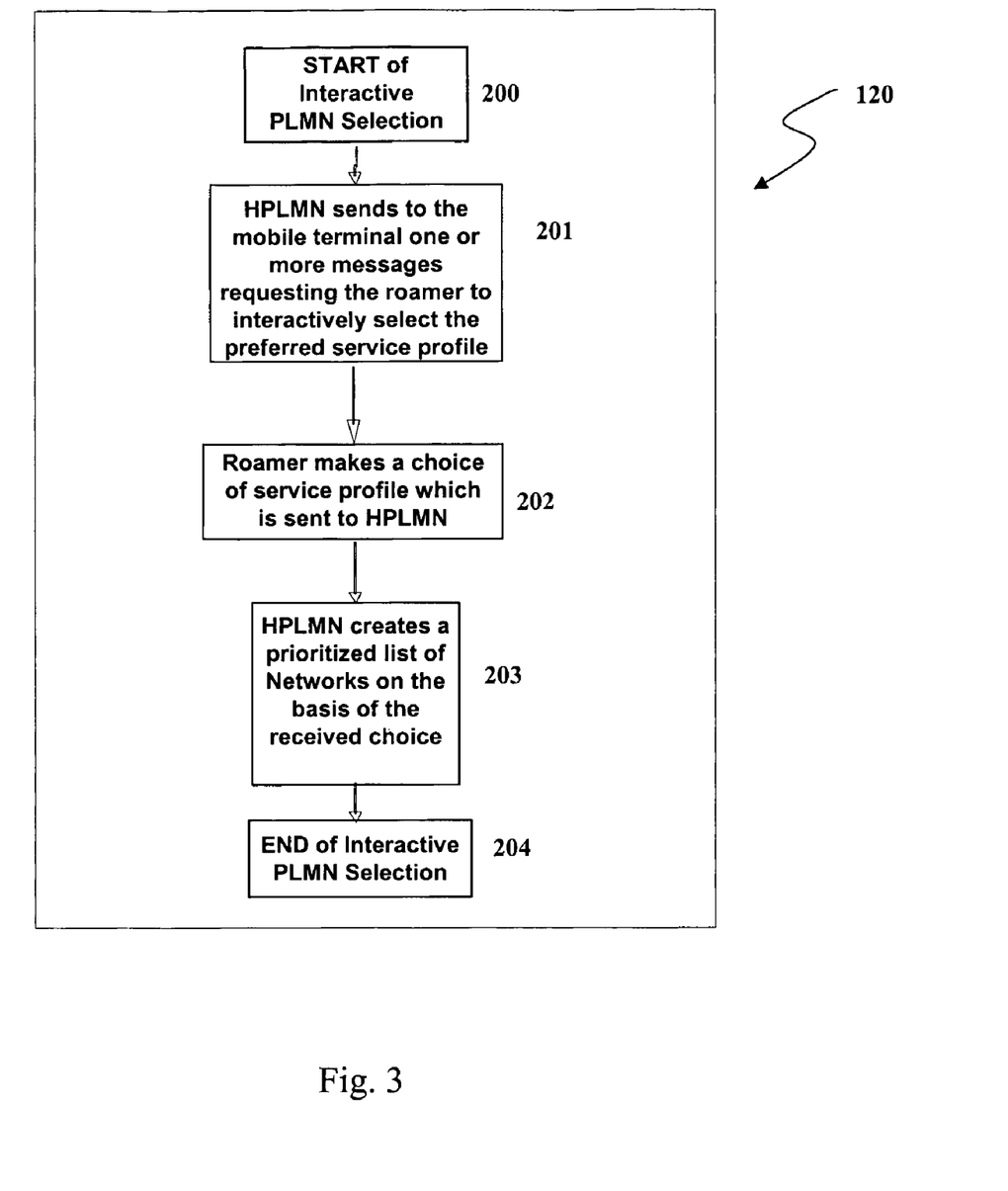
FIG. 3 is a schematic flowchart of the interaction procedure relevant to an invention embodiment.

FIG. 3 shows details of the interactive PLMN selection procedure [Step 120 of FIG. 2] which is followed when the Home Network interacts with the out-roamer according to the present invention. In the following, reference to elements shown in FIG. 1 is made using the same reference numerals of FIG. 1.

[Step 201] (Optional and preferred) The out-roamer receives from the HPLMN on the mobile terminal 10 a request for a choice of a service profile. Preferably, the mobile terminal 10 displays one or more display screens which guide the out-roamer through the choice of the favorite set of services and the priority criteria (jointly the "service-profile");

[Step 202] Out-roamer makes his/her choice for the user-preferred service profile and the mobile terminal 10 sends it to the Home Network 60;

[Step 203] HPLMN 60, on the basis of the service-profile received by the out-roamer, finds the VPLMN most suited to the out-roamer preference. Preferably, it generates a list of V-PLMN sorted by the received priority criteria.

Figure 4:
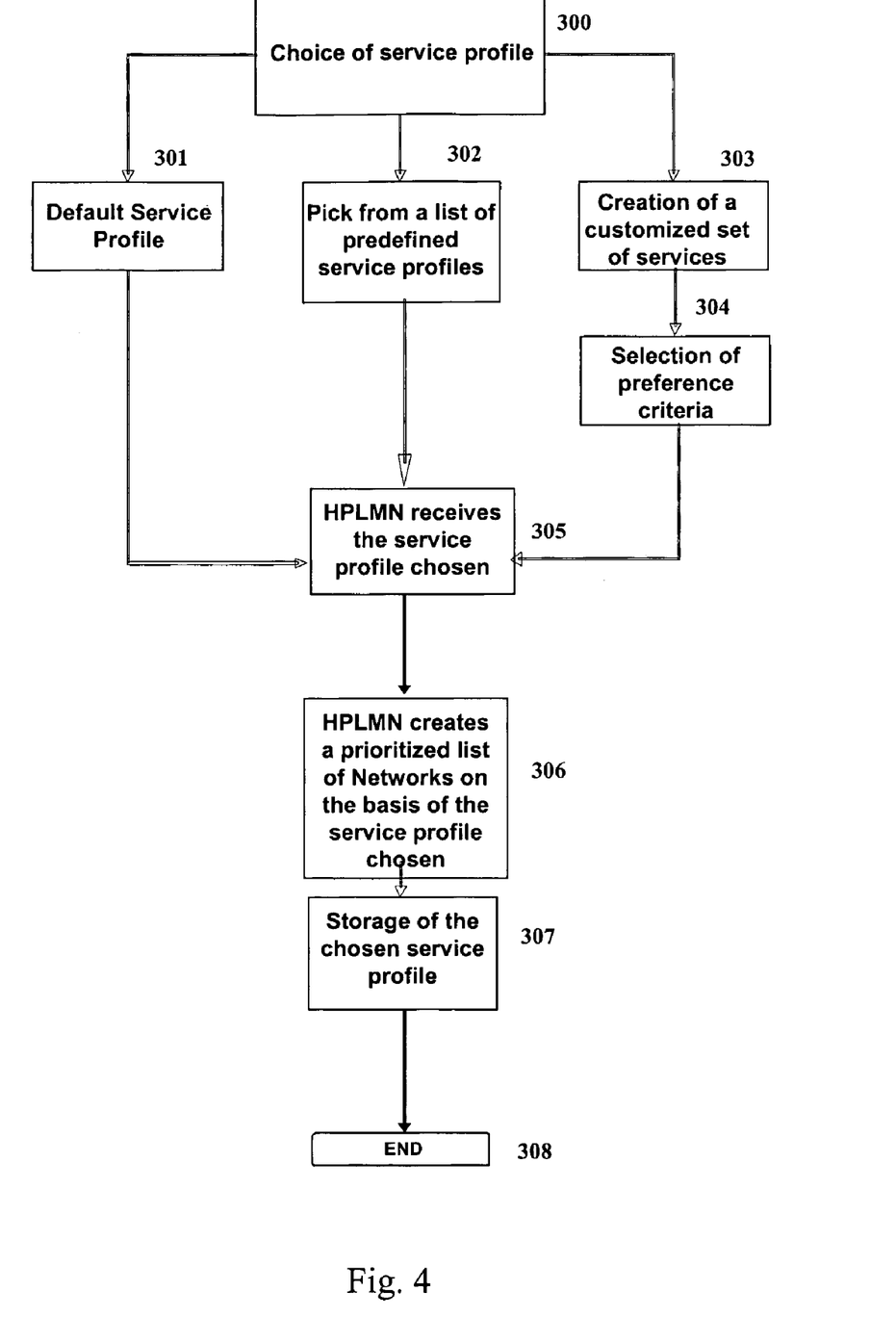
FIG. 4 is a schematic flowchart showing possible steps of the interaction procedure, in an embodiment of the present invention.

FIG. 4 schematically shows the details of a possible out-roamer/HPLMN interaction during the procedure of the present invention. For the procedure of FIG. 4 to take place, the terminal may be furnished of a WEB or WAP browser and a data connection, such as UMTS, GPRS, EDGE or the like, to a suitable WEB or WAP page, said connection being started as described above. When applicable, reference to elements shown in FIG. 1 is made using the same reference numerals of FIG. 1.

[Step 300] The Application Server 50 sends to the mobile terminal 10 a display screen showing the options for the interactive service profile selection (e.g. 'default', 'pick from a list', 'custom'). The out-roamer selects the preferred option.

[Step 301] The out-roamer may select the option "Default Service Profile", which may be a user-predefined service-profile (e.g. at the time when the interactive selection service has been subscribed) or the service-profile last saved as default. Optionally (not shown), the last used service profile may also be displayed for quick selection.

[Step 302] The out-roamer may select the option "Pick from a list" wherein he/she is allowed to select a preferred service profile from a set of service profiles prepared by the Home Operator or previously saved by the user. An exemplary list of possible predefined service profiles (set of services and, in bracket, associated preference criteria in order of importance) follows for illustrative purpose:

Voice (cost: low; coverage>60%)+SMS (same as voice)
Voice (QoS: high; coverage>80%)+SMS (no criteria)
Voice (cost: low; coverage>60%)+SMS (same as voice)+ MMS (cost: pay-per-use; cost: low; coverage>60%)
Broadband data (downlink band: high; uplink band: low; QoS: high)
Voice (cost: low; coverage>60%)+narrowband data (cost: low; coverage>60%)

Voice (cost: low; coverage>60%)+Video call (QoS: high; cost: low)
. . .

[Step 303] The out-roamer may enter the option "Creates your Set of Services". In this case the out-roamer receives a template containing a list of individual services and the user builds by him/herself the user-preferred set of services. An exemplary list of services presented may include one or more of the following items:
Voice
Narrowband Data
Broadband Data
Only mobile terminated voice call
Push to talk
SMS
MMS
e-mail
WEB or WAP browsing
File download (FTP)
File sharing
Video call
Instant messaging
Video streaming
. . .

[Step 304] After Step 303, wherein a set of desired services has been created, the out-roamer selects the criteria or parameters used to find the VPLMN most suitable to his/her needs. He/she may select, for each one of the previously selected services, one or more criteria which he/she regards to be worth to be taken into account for network selection. Next, for each one of the selected criteria, the out-roamer, in view of the priority to be assigned to the selected networks, may specify a minimum and/or maximum required level or a degree of importance. The Home Operator advantageously interactively displays on the user terminal 10 the lists of suitable values associated to the currently selected criterion and/or the lists of degrees of importance (e.g. no importance, low importance, fair importance, high importance, maximum importance) among which the out-roamer may select in real-time the desired item. The degree of importance may also be specified by sorting the criteria. In one embodiment, the out-roamer may specify both a required value and a degree of importance. Examples of criteria are QoS (may include further parameters to be specified such as the percentage of connection on, the percentage of cut-off, set-up time, Mean Opinion Score, etc. . . . ), uplink band, downlink band, tariff (the user may choose the type of tariff associated, for example flat, on pay-per-use basis, on time band basis, etc, . . . ), coverage, etc.

As an illustrative example, suppose that the out-roamer has associated to the broadband data connection service (e.g. UMTS) the following criteria of preference: uplink band, downlink band, coverage and costs. Then, he/she may select for the uplink and downlink bands one respective item from the following list sent by the HPLMN and displayed real-time on the terminal display: low, middle, high. Alternatively or in addition, a list of bit rate values may be displayed for selection by the roamer. The same holds for the cost (e.g. low, middle, high) and for the coverage (e.g. 20%, 40%, 60%, 80%, 100%).

Suppose that the roamer has chosen the following criteria:
coverage: 50%
downlink band: high
uplink band: low
tariff: middle Then he/she may assign a degree of importance to each of them, for example by associating a degree of importance or by sorting the above list in order of importance, such as:
downlink band: high
tariff: middle
coverage: 50%
uplink band: low Advantageously, the above lists of pre-defined service profiles and/or of individual services and preference criteria are stored in the Application Server 50.

Optionally, in this phase the user may modify some additional parameters configuring the interactive PLMN selection service. For example, he/she may configure the service so that the interactive selection procedure does not take place any time the mobile terminal is switched on: in this case the mobile terminal remains registered on the PLMN onto which it was registered before switch-off.

[Step 305] HPLMN receives the choices made by the out-roamer.

[Step 306] HPLMN, on the basis of the received choice of the out-roamer and of the information contained in Database 30, finds the 'best' PLMN or generates a sorted list of PLMN, from the best to the worst. Advantageously, the HPLMN and the other PLMNs may continuously exchange information on the status of their respectively owned networks so as to real-time update the Database 30. In this way the HPLMN may address the out-roamer towards a specific network also according to the current availability of network resources.

[Step 307] Optional and preferred. The AS 50 saves the chosen service profile (last saved service profile) for subsequent use. For example, the user may choose to save the service profile created in Steps 303 and 304 (if not already present) in the list of predefined set of services for subsequent use in Step 302. In addition or in alternative, he/she may also save the currently selected service profile as the default service profile.

Although the present invention has been disclosed and described by way of some embodiments, it is apparent to those skilled in the art that several modifications to the described embodiments, as well as other embodiments of the present invention are possible without departing from the essential features thereof/the scope thereof as defined in the appended claims.

The invention claimed is:

1. A method for allowing selection of a visited mobile network for a roaming mobile terminal of a subscriber of a home network, comprising, at the home network:
   a. receiving information on the location of the roaming mobile terminal;
   b. sending to the roaming mobile terminal a request for service information, requesting from the user of said mobile terminal a choice of a service profile;
   c. receiving from the roaming mobile terminal service information comprising a user-preferred service profile chosen by said user; and
   d. controlling the selection of the visited mobile network for the roaming mobile terminal on the basis of received service information and location information, wherein the controlling the selection includes creating a prioritized list of visited mobile networks on the basis of the received service information, location information, and information on said visited mobile networks possessed by the home network.

2. The method of claim 1, wherein, in the step of controlling the selection of the visited mobile network, the home network sends at least a portion of said prioritized list to the roaming mobile terminal.

3. The method of claim 2, wherein said portion of the prioritized list is suitable for use by the roaming mobile terminal for selecting said visited mobile network.

4. The method of claim 2, wherein said portion of the prioritized list is made available to a user of the roaming mobile terminal for selecting said visited mobile network.

5. The method of claim 1, wherein, in the step of controlling the selection of the visited mobile network, the home network sends to the roaming mobile terminal command information suitable for the registration of the roaming mobile terminal to the visited mobile network.

6. The method of claim 5, wherein the command information comprises a refresh command for the mobile terminal.

7. The method of claim 1, wherein said service information further comprises at least a choice of a criterion for preference of the visited mobile network.

8. The method of claim 1, wherein the received service information comprises a service profile chosen by a user of the roaming mobile terminal from a list of predefined service profiles, said list being previously sent by the home network to the roaming mobile terminal.

9. The method of claim 1, wherein the received service information comprises a service profile created by a user of said roaming mobile terminal in interaction with the home network.

10. A method for selecting a visited mobile network for a roaming mobile terminal of a subscriber of a home network, comprising:
  a. receiving at the roaming mobile terminal a request for service information requesting from the user of said mobile terminal a choice of a service profile;
  b. sending from the roaming mobile terminal to the home network service information comprising a user-preferred service profile chosen by said user;
  c. receiving at the roaming mobile terminal from the home network command information depending on the service information and on information on the location of the roaming mobile terminal, wherein the command information comprises a prioritized list of visited mobile networks created by the home network on the basis of the service information, the location information, and information on said visited mobile networks possessed by the home network; and
  d. using said command information at the roaming mobile terminal for selecting the visited mobile network.

11. The method of claim 10, wherein said service information further comprises at least a choice of a criterion for preference of the visited mobile network.

12. The method of claim 10, wherein said service information comprises a service profile chosen by a user of the roaming mobile terminal from a list of predefined service profiles, said list being previously received at the roaming mobile terminal from the home network.

13. A mobile network comprising:
  a unit, wherein said unit monitors a signaling network connecting the mobile network to a roaming environment and to control the selection of a visited mobile network for a mobile terminal in said roaming environment;
  a database comprising data on mobile networks within said roaming environment; and
  an application server operatively connected to the database and to the unit, wherein said application server:
    a. receives information on the location of the mobile terminal in the roaming environment,
    b. sends to the mobile terminal a request for service information, requesting from the user of said mobile terminal a choice of a service profile;
    c. receives from the mobile terminal in said roaming environment service information comprising a user-preferred service profile chosen by said user, wherein the application server creates a prioritized list of the mobile networks within said roaming environment, on the basis of the received location information and service information, and of the data in the database; and
    d. instructs the unit to control the selection of the visited mobile network on the basis of the received location information and service information and of the data in the database.

14. The network of claim 13, wherein the unit sends at least a portion of said prioritized list to the mobile terminal.

15. The network of claim 14, wherein said portion of the prioritized list is suitable for use by the mobile terminal for selecting said visited mobile network.

16. The network of claim 13, wherein the sends to the mobile terminal command information suitable for the registration of the mobile terminal to the visited mobile network.

17. The network of claim 13, wherein said service information further comprises at least a choice of a criterion for preference of the visited mobile network.

18. The network of claim 13, wherein the application server sends to the mobile terminal a list of predefined service profiles suitable for a choice by a user of the mobile terminal.

19. The network of claim 13, wherein the application server sends to the mobile terminal one or more templates suitable for the creation by a user of the mobile terminal of a service profile.

20. The network of claim 13, wherein the mobile network comprises GSM or GPRS or UMTS networks.

* * * * *

UNITED STATES PATENT AND TRADEMARK OFFICE
CERTIFICATE OF CORRECTION

| | | |
|---|---|---|
| PATENT NO. | : 8,391,857 B2 | Page 1 of 1 |
| APPLICATION NO. | : 11/918748 | |
| DATED | : March 5, 2013 | |
| INVENTOR(S) | : Catalano et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1335 days.

Signed and Sealed this
Twenty-fourth Day of February, 2015

Michelle K. Lee
*Deputy Director of the United States Patent and Trademark Office*